(12) United States Patent
Goodrow et al.

(10) Patent No.: US 10,053,018 B1
(45) Date of Patent: Aug. 21, 2018

(54) HEADREST HOOK

(71) Applicant: Honda Motor Co., Ltd., Minato-ku, Tokyo (JP)

(72) Inventors: Samuel D. Goodrow, Dublin, OH (US); Andrew Barrow, Hilliard, OH (US); Andrea S. Martin, Powell, OH (US); Joan R L Smith, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/470,589

(22) Filed: Mar. 27, 2017

(51) Int. Cl.
  *B60R 7/10* (2006.01)
  *B60R 7/04* (2006.01)

(52) U.S. Cl.
  CPC ............. *B60R 7/043* (2013.01); *B60R 7/10* (2013.01)

(58) Field of Classification Search
  CPC ............. B60R 7/10; B60R 2011/0017; B60N 2002/4405; Y10S 224/927
  USPC ........................................ 224/275, 539, 544
  See application file for complete search history.

(56) References Cited

U.S. PATENT DOCUMENTS

| | | | | |
|---|---|---|---|---|
| 6,692,067 | B2 * | 2/2004 | Inari | B60N 3/023 224/313 |
| 6,935,601 | B2 * | 8/2005 | Tanaka | B60R 7/02 224/282 |
| 7,337,934 | B2 * | 3/2008 | Alling | F16B 2/10 224/401 |
| 8,733,830 | B2 * | 5/2014 | Sanchez | B60N 2/4838 297/188.03 |
| 2012/0214106 | A1 | 11/2012 | Ackeret et al. | |
| 2013/0229045 | A1 | 9/2013 | Agustin | |

FOREIGN PATENT DOCUMENTS

| | | |
|---|---|---|
| DE | 102007020157 A1 | 10/2008 |
| DE | 102009037354 A1 | 3/2010 |
| JP | H05-058494 U | 8/1993 |
| NO | 2007045230 A1 | 4/2007 |
| NO | 2009112280 A2 | 9/2009 |

* cited by examiner

*Primary Examiner* — Adam Waggenspack
(74) *Attorney, Agent, or Firm* — Honda Patents & Technologies North America, LLC (57) ABSTRACT

A headrest assembly may include a headrest having a first external surface and a second external surface and a hook slidingly engaged within the headrest. The hook may include a first hook portion and a second hook portion. When the hook is in a first position, the first hook portion is substantially flush with the first external surface and the second hook portion is substantially flush with the second external surface. When the hook is in a second position, the first hook portion is offset from the forward external surface and the second hook portion is offset from the rearward external surface.

19 Claims, 7 Drawing Sheets

HEADREST HOOK

BACKGROUND

Seats can be found in many different locations and in many configurations. Many seats also include headrests. Seats can be used as a place for someone to sit or also as a place to store various items. For example, in a vehicle, a driver sits in the driver seat and may place an item, such as a bag or purse in the passenger seat for easy access. Placing the bag or purse in the passenger seat may also keep the bag off the floor and from getting dirty. In the vehicle setting, driving maneuvers, such as unexpected braking, may cause the bag to slide off of the seat and land on the floor, potentially getting dirty or spilling its contents. Therefore, a need exists to have a place on a seat for a user to put his or her item that keeps the item from falling off the seat and still allows someone to sit in the seat.

BRIEF DESCRIPTION

In one aspect, a headrest assembly may include a headrest having a first external surface and a second external surface and/or a hook slidingly engaged within the headrest. The hook may include a first hook portion and a second hook portion. When the hook is in a first position, the first hook portion is substantially flush with the first external surface and the second hook portion is substantially flush with the second external surface. When the hook is in a second position, the first hook portion is offset from the first external surface and the second hook portion is offset from the second external surface.

In another aspect, a headrest assembly may include a headrest having a first external surface and a second external surface. A bracket having a channel may be attached to the headrest. A hook may be slidingly engaged within the channel, the hook having a first hook portion on a first end and a second hook portion on a second end. When the hook is in a first position, the first hook portion is forward of the first external surface and the second hook portion is forward of the second external surface. When the hook is in a second position, the first hook portion is rearward of the first external surface and the second hook portion is rearward of the second external surface.

In yet another aspect, a headrest assembly may include a headrest having a first external surface and a second external surface. A bracket may be attached to the headrest, the bracket having a longitudinal length and a channel disposed along the longitudinal length of the bracket. The channel may include a first sidewall including a first tongue disposed longitudinally along the first sidewall, a second sidewall including a second tongue disposed longitudinally along the second sidewall and a top wall. The first tongue may include a first protrusion and a second protrusion and the second tongue may include a third protrusion and a fourth protrusion. A hook may include a longitudinal portion having a first end disposed toward the first external surface and a second end disposed toward the second external surface. The longitudinal portion may also include a first side having a first groove for receiving the first tongue in sliding engagement. The first groove may also include a first recess and a second recess. The longitudinal portion may also include a second side having a second groove for receiving the second tongue in sliding engagement. The second groove may include a third recess and a fourth recess. The longitudinal portion may also include a bottom surface having a plurality of lateral ridges, a first hook portion disposed on the first end, and a second hook portion disposed on the second end. The hook may be slidable between a first position, second position and third position. When in the first position, the first protrusion is aligned with the first recess and the third protrusion is aligned with the third recess and the first hook portion extends forward of the first external surface. When in the second position, the second protrusion is aligned with the second recess and the fourth protrusion is aligned with the fourth recess and the second hook portion extends rearward of the second external surface.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The exemplary embodiments described herein are related to an assembly for a chair or seat that allows the user to place an item on the chair or seat and keep the item secured in place. The exemplary embodiments describe a headrest assembly that includes a hook that can be moved between multiple positions. This allows the hook to be stowed or hidden when not in use and deployed into various positions for receiving an item for storage.

Figure 1:
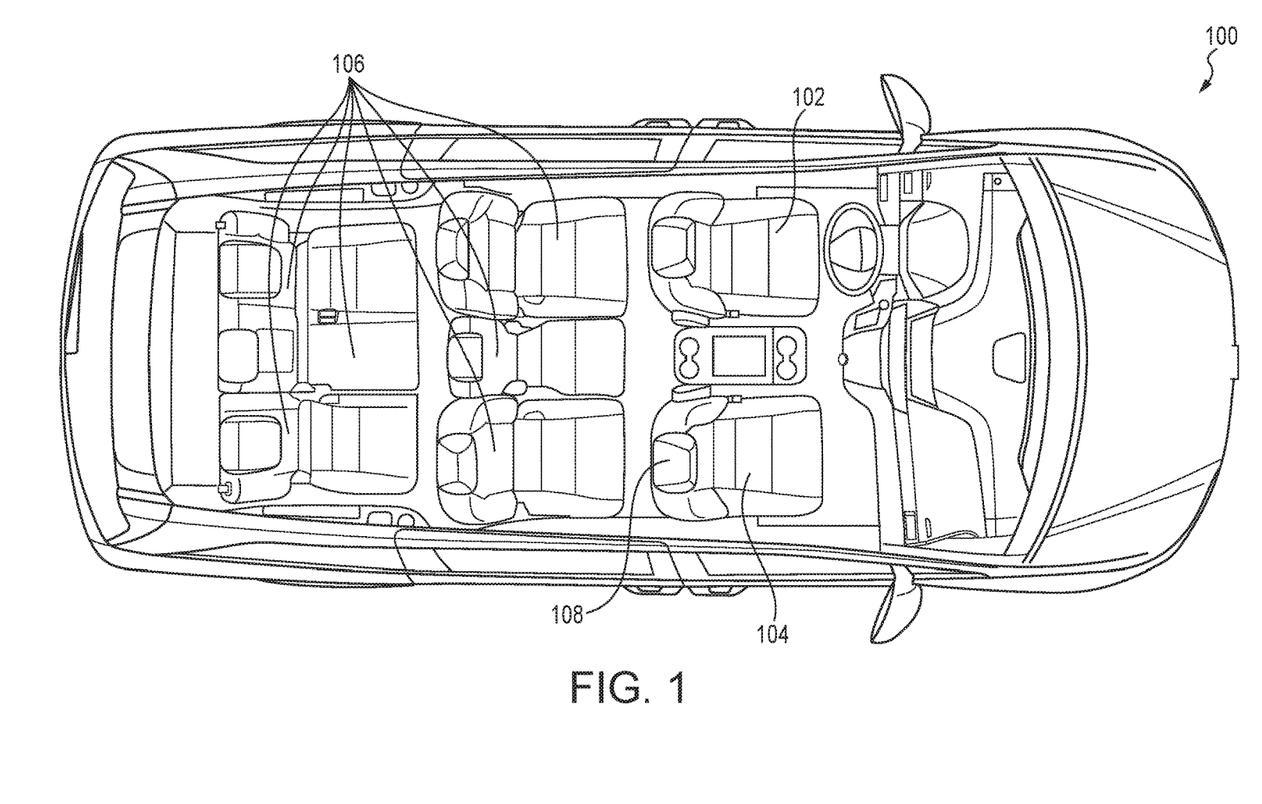
FIG. 1 is a schematic view of an exemplary vehicle where an exemplary embodiment may be used.

Referring now to the drawings, wherein the showings are for purposes of illustrating one or more exemplary embodiments and not for purposes of limiting the same, FIG. 1 illustrates a schematic view of an exemplary location where one exemplary embodiment may be used. A vehicle 100 is shown. The vehicle 100 may include a plurality of seats, such as driver seat 102, passenger seat 104 and other seats 106. The seats 102, 104 and 106 may include headrests such as headrest 108. The vehicle shown in FIG. 1 can be any passenger vehicle such as a passenger car, sport utility vehicle, van, truck or the like. The embodiments described herein may also be used in other locations. Other exemplary locations include other types of vehicles, such as buses or airplanes. The embodiments described herein may also be used outside of vehicles, such as on any type of chair or seat. Additional exemplary seat locations include classrooms, auditoriums, movie theatres, office spaces, etc.

Figure 2:
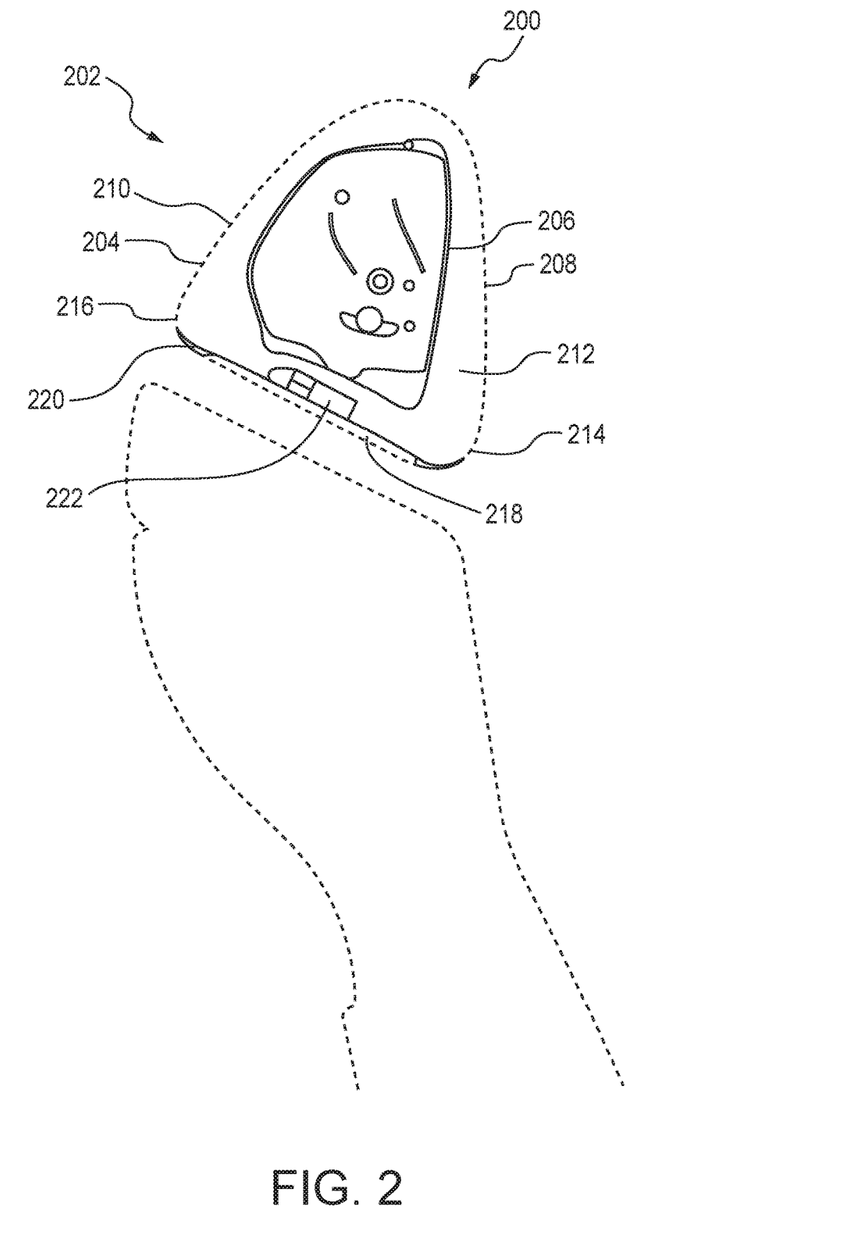
FIG. 2 is a cross sectional view of an exemplary seat in accordance with one exemplary embodiment.

FIG. 2 illustrates a cross sectional view of an exemplary seat 200, headrest 202 and headrest assembly 204. The seat 200 may be a vehicle passenger seat, such as passenger seat 104 in FIG. 1. The headrest assembly 204 includes an internal support structure 206 that may be used to attach the headrest 202 to the seat 200 and to support a first external surface 208, second external surface 210 and cushioning 212 of the headrest assembly 204. The first external surface 208 includes a contour 214 near the bottom of the headrest 202. The second external surface 210 also includes a contour 216 near the bottom of the headrest 202. The contour 214 of the first external surface 208 and contour 216 of the second external surface 210 denote the shape of the headrest 202 where it transitions from a first external surface 208 and second external surface 210, respectively, to a bottom external surface 218. The shape of the contour 214 of the first external surface 208 and contour 216 of the second external surface 210 can be any curved shape with one or more radii. The contour 214 of the first external surface 208 can be the same as the contour 216 of the second external surface 210 or they can be different. For example, in one exemplary embodiment the contour 214 of the first external surface 208 may have a smaller radius or smaller combination of radii than contour 216 of the second external surface 210 while in another exemplary embodiment the radii could be the same. The first external surface 208 and the second external surface 210 of the headrest assembly 204 may be made of a pliable material such as cloth or leather. This material may be different from the material of the internal support structure 206 which may be made of metal or other similar material of sufficient strength. In one exemplary embodiment, the headrest 202 may be integrated into the seat 200. In another exemplary embodiment, the headrest 202 may be removably connected to the seat 200. A traditional post and hole structure may be used for this connection. This structure may also allow the headrest 202 to be positioned at different heights.

The headrest assembly 204 also includes a hook 220. The hook 220 may be slidingly engaged with the headrest 202 and the headrest assembly 204 with a bracket 222 or similar structure. As used herein, the term "bracket" can be any structure that allows sliding engagement between the hook 220 and the headrest 202 and should not be limited to the bracket 222 shown and described in FIG. 2 above and FIG. 4 below. In one exemplary embodiment, the headrest assembly 204 may be moveable between different vertical positions with respect to the seat 200 such that the entire headrest assembly 204 including the hook 220 are moveable between those positions.

Figure 3:
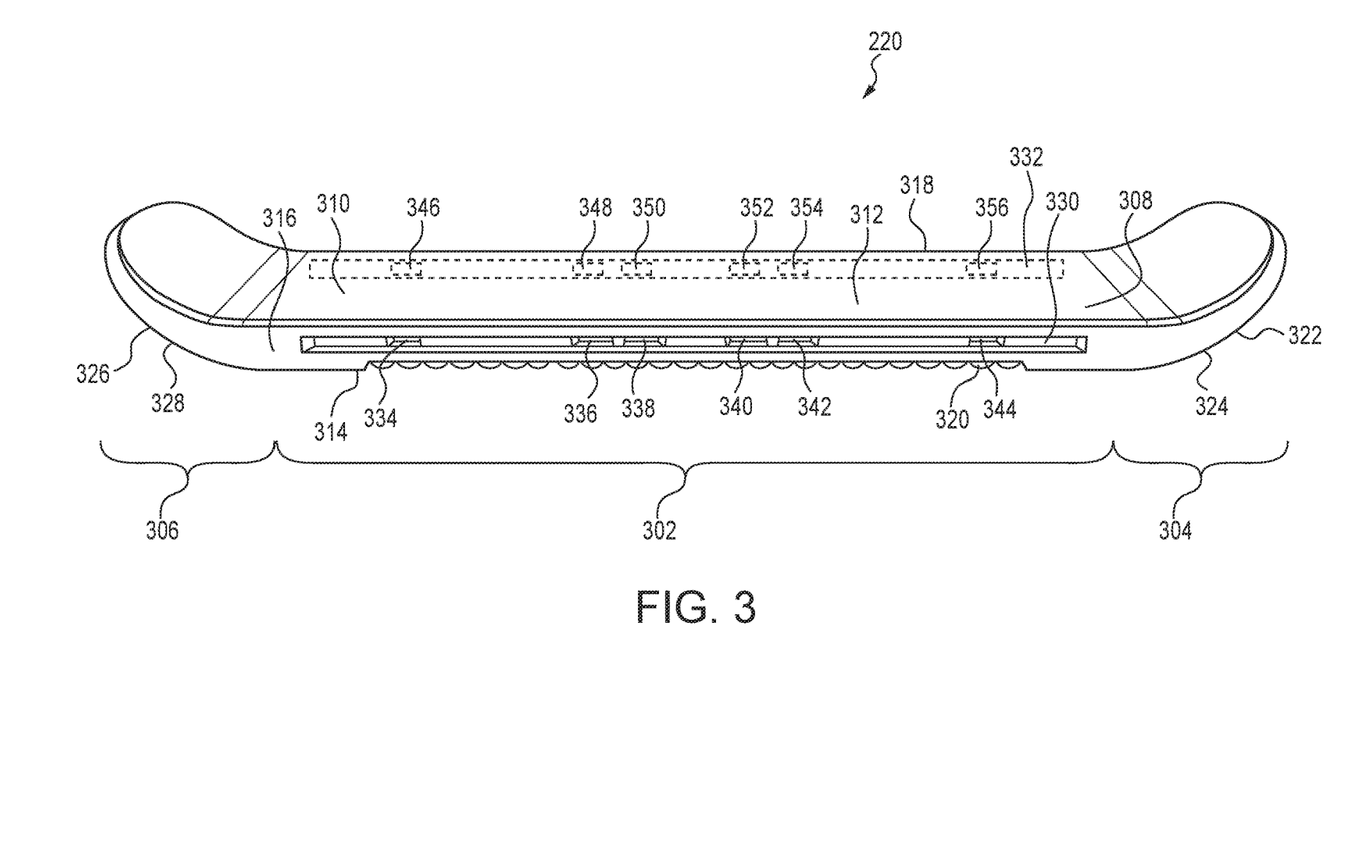
FIG. 3 is a perspective view of an exemplary embodiment of the hook shown in FIG. 2.

FIG. 3 is a perspective side view of an exemplary embodiment of the hook 220 shown in FIG. 2. The hook 220 includes a longitudinal portion 302, a hook portion 304 and a hook portion 306. The longitudinal portion 302 includes one end 308 disposed toward the first external surface 208 of the headrest 202 and another end 310 disposed toward the second external surface 210 of the headrest 202. The hook portion 304 may be attached to or integral with the end 308. The hook portion 306 may be attached to or integral with the end 310. The longitudinal portion 302 also includes a top surface 312, a bottom surface 314, a first side 316 and a second side 318. The top surface 312 and bottom surface 314 may both be flat or have a similar shape that facilitates sliding movement. The bottom surface 314 may also include a plurality of lateral ridges 320. The lateral ridges 320 may be arranged laterally across or generally perpendicular to the longitudinal portion 302. The lateral ridges 320 may assist a user in grabbing the hook 220 to move it from one position to another. The hook 220 may be made out of one material, such as plastic or metal. The lateral ridges 320 may be made out of the same material as the hook 220 or a different material, such as rubber or silicone. In one exemplary embodiment, the lateral ridges 320 can instead be a rough surface coating or other material that allows the hook 220 to be held without losing grip.

The hook portion 304 includes a first hook external surface 322. The first hook external surface 322 may be curved with one or more radii. The first hook external surface 322 includes a contour 324. The first hook external surface 322 and the contour 324 may be shaped to be substantially similar to the first external surface 208 of the headrest assembly 204 so that the two surfaces may be substantially aligned or flush when the hook 220 is in certain positions, as will be described in more detail below. In one embodiment, the contour 324 of the first hook external surface 322 may be substantially similar to the contour 214 of the first external surface 208 shown in FIG. 2. In other embodiments, the contour 324 may be different from the contour 214. The first hook external surface 322 may be made from the same material as the first external surface 208. This may allow the hook 220 to blend inor be hidden as much as possible when in certain positions. In other embodiments, the first hook external surface 322 may be made from a different material than the first external surface 208.

The hook portion 306 includes a second hook external surface 326. The second hook external surface 326 may be curved with one or more radii. The second hook external surface 326 may also include a contour 328. The second hook external surface 326 and the contour 328 may be shaped to be substantially similar to the second external surface 210 of the headrest assembly 204 so that the two surfaces may be aligned when the hook 220 is in certain positions. In one embodiment, the contour 328 of the second hook external surface 326 may be substantially similar to the contour 216 of the second external surface 210 shown in FIG. 2. In other embodiments, the contour 328 may be different from the contour 216. The second hook external surface 326 may be made from the same material as the second external surface 210. This may allow the hook 220 to blend in or to be hidden as much as possible when in certain positions. In other embodiments, the second hook external surface 326 may be made from a different material than the second external surface 210.

In one exemplary embodiment, the contour 324 of the first hook external surface 322 may be substantially the same shape as the contour 328 of the second hook external surface 326. In other embodiments, the contour 324 may have a different shape than the contour 328. For example, in one exemplary embodiment, the contour 324 may include more than one radii in its shape and curvature or a smaller radius than the contour 328. This may cause the hook portion 304 to have a more substantial hook shape than the hook portion 306. This embodiment may be used when the hook 220 is installed in an angled orientation. For example, as shown in FIG. 2, the hook portion 304 may be lower than the hook portion 306. In this configuration, the hook portion 304 and the contour 324 may have smaller radii giving a more substantial hook shape. This may offset the angled orientation of the hook 220 to keep items on the hook portion 304 from falling off.

In one exemplary embodiment, the longitudinal portion 302 may include a groove 330 on the first side 316 and a groove 332 on the second side 318. The groove 330 may include a plurality of recesses, 334, 336, 338, 340, 342 and 344. The groove 332 may also include a plurality of recesses, 346, 348, 350, 352, 354, and 356. The recesses will be described in more detail below in relation to bracket 222 and FIG. 4.

Figure 4:
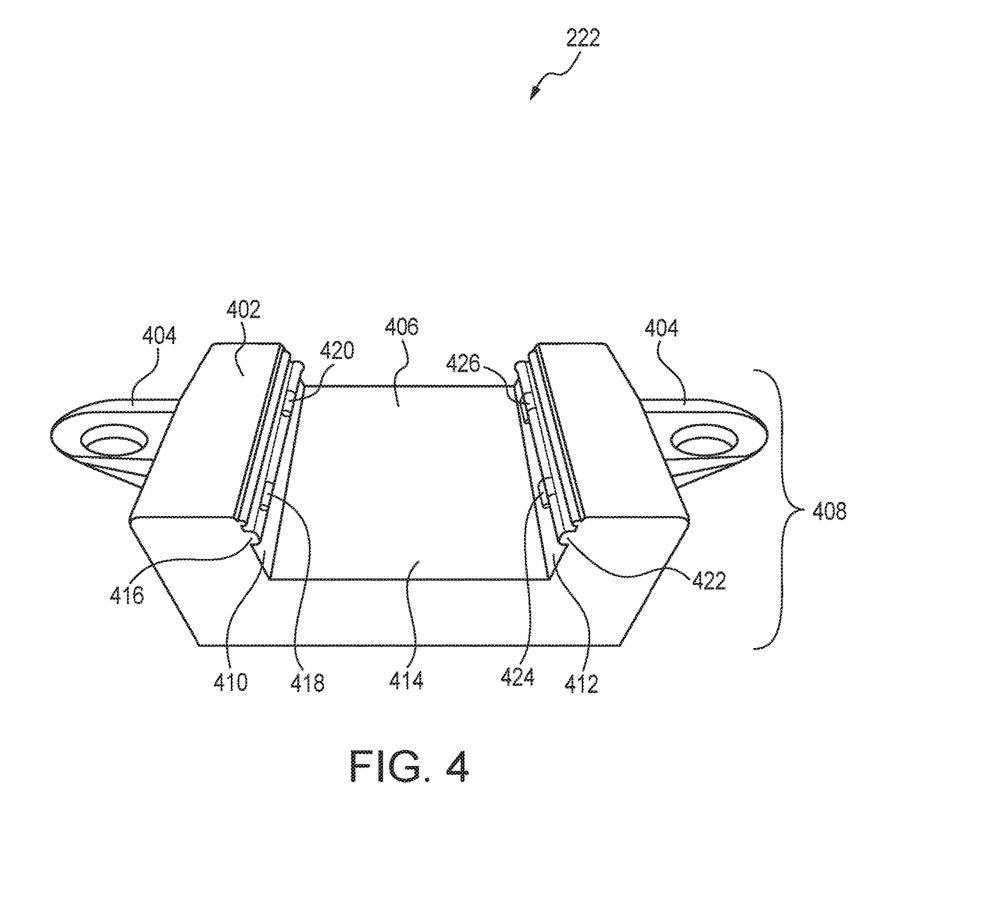
FIG. 4 is a perspective view of an exemplary embodiment of the bracket shown in FIG. 2.

FIG. 4 is a perspective bottom view of bracket 222 shown in FIG. 2. In other words, when the bracket 222 is attached to the headrest assembly 204 it is upside down from the configuration shown the FIG. 4. The bracket 222 has a main body 402. As shown in FIG. 4, the main body 402 generally has a U-shape but other configurations and shapes are possible. The main body 402 includes one or more attachment members 404. The attachment members 404 are exemplary and other configurations or attachment mechanisms are possible. The attachment members 404 may be used with screws, bolts or similar attachment structures (not shown) to attach the bracket 222 to the headrest assembly 204 and internal support structure 206. The main body 402 also includes a channel 406 disposed along the longitudinal length 408 of the bracket 222. The channel 406 has a first sidewall 410, a second sidewall 412 and a top wall 414 also disposed along the longitudinal length 408 of the bracket 222. The channel 406 may be sized to receive the hook 220 and as described above may be installed in the headrest assembly 204 such that the hook 220 is positioned below the top wall 414 when engaged. In another exemplary embodiment, the bracket 222 may be installed in the direction shown in FIG. 4, such that the top wall 414 of the channel 406 is below the hook 220 when engaged.

The first sidewall 410 may include a tongue 416. The tongue 416 may have one or more protrusions. FIG. 4 shows a protrusion 418 and a protrusion 420 but more or less protrusions are possible. The second sidewall 412 includes a tongue 422. The tongue 422 may also include one or more protrusions. FIG. 4 shows a protrusion 424 and a protrusion 426 but more or less protrusions are possible. The tongue 416 and the tongue 422 may be parallel to each other along the longitudinal length 408 of the bracket 222.

In one exemplary embodiment, when the hook 220 is installed in the bracket 222, the tongue 416 and the tongue 422 may each engage with either groove 330 or groove 332, depending on the orientation of the hook 220. For example, in one configuration, the groove 330 on the first side 316 of the hook 220 may engage the tongue 416 on the first sidewall 410 of the bracket 222 and the groove 332 on the second side 318 of the hook 220 may engage the tongue 422 on the second sidewall 412. The groove 330 and the groove 332 may be sized and shaped to receive the tongue 416 and the tongue 422, respectively, in sliding engagement. This allows the hook 220 to slide between one or more positions. In addition, the one or more protrusions on tongue 416 and/or the tongue 422 may engage with one or more recesses in the groove 330 and the groove 332 to hold the hook 220 in one of multiple positions as will be described further with regard to FIGS. 5-7. In describing hook 220 and bracket 222, it should be apparent that the tongue and groove arrangement could be reversed such that the tongues are disposed on the hook 220 and the grooves are disposed on the bracket 222. In addition, the recesses and protrusions could be reversed as well. The recesses could be on the tongues and the protrusions could be in the grooves. Any combination of those configurations is also possible. As should be apparent to one of ordinary skill in the art, the protrusion/recess combination described above may be a detent-type structure and other detent-type structures may be used instead of the one described above. For example, the protrusions may include a spring mechanism to bias the protrusions into the recesses. Other detent-type mechanisms are also possible. In other exemplary embodiments, the tongue and groove arrangement could be removed and the hook 220 could be enclosed in the channel 406 and slidingly engaged therein.

In one exemplary embodiment, where multiple protrusions and recesses are used on each side, they may be equally spaced apart from each other to ensure each protrusion can engage with a recess. For example, as shown in FIG. 3 and FIG. 4, the protrusion 418 and the protrusion 420 may be spaced apart longitudinally a first distance and the recess 336 and the recess 342 may be spaced apart longitudinally be the same first distance. This allows the protrusions and recesses to engage and secure the hook 220 in position in the bracket 222. As will be described below with reference to FIGS. 5-7, different protrusion/recess combinations can be used for the different positions of the hook 220.

Figure 5:
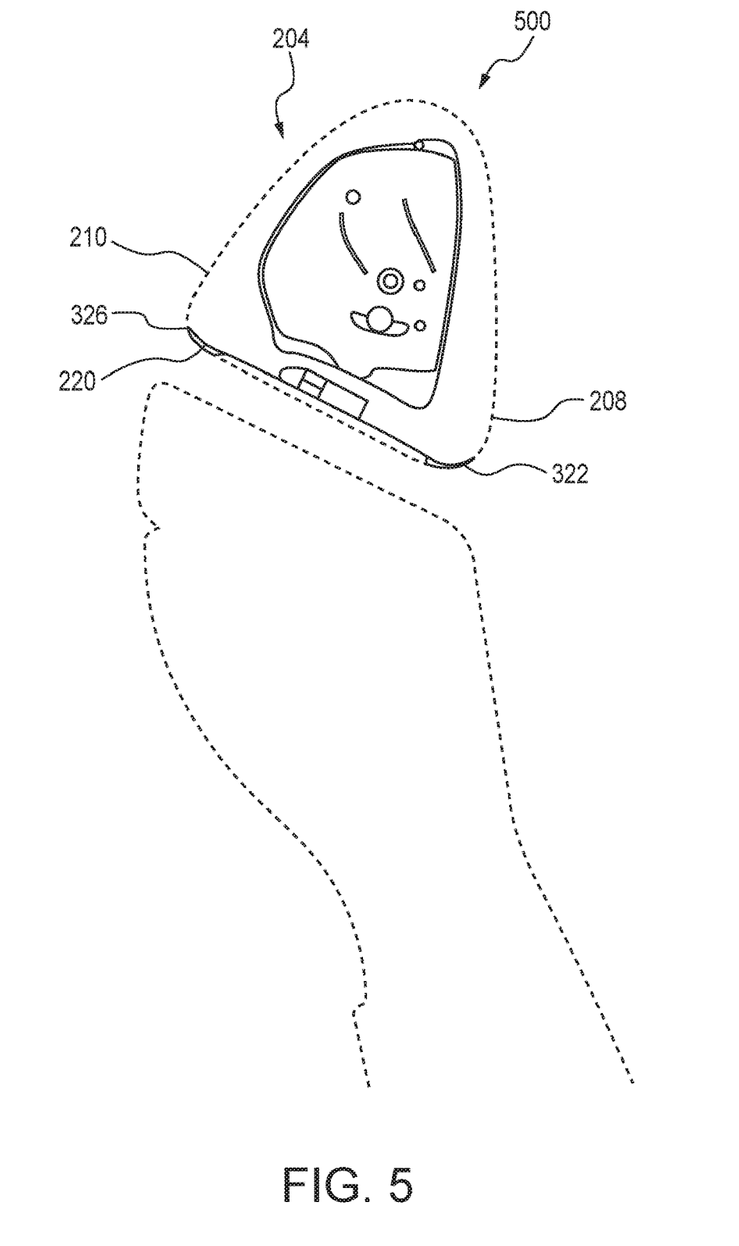
FIG. 5 is a cross sectional view of an exemplary embodiment of the headrest assembly shown in FIG. 2 with the hook in a stowed position.

FIG. 5 is a cross sectional view of an exemplary embodiment of a headrest assembly 204 and hook 220 showing the hook 220 in a stowed position 500. When in the stowed position 500, also called the hidden position, the first hook external surface 322 and second hook external surface 326 may be substantially flush with the first external surface 208 and the second external surface 210, respectively. Referring back to FIG. 3 and FIG. 4 in relation to FIG. 5, when the hook 220 is in the stowed position 500 one or more protrusions may be aligned with and be received by one or more recesses. In one exemplary embodiment, when in the stowed position 500, the recess 336 in the groove 330 may receive the protrusion 420 of the tongue 416 and the recess 342 may receive the protrusion 418. In addition, the recess 348 in the groove 332 may receive the protrusion 426 of the tongue 422 and the recess 354 may receive the protrusion 424. From the stowed position 500, the hook 220 may be moved to either the forward position 600 or the rearward position 700, as described in more detail below.

While in the stowed position 500, the hook 220 may be held in place until a force is applied in either the forward or the rearward directions to slide the protrusions from the recesses. The hook 220 may continue to slide until the next set of protrusions and recesses are engaged. The protrusions and recesses are sized and shaped in such a way to maintain the position of the hook 220 under normal conditions (or driving conditions in the vehicle context), while still allowing a user to change the position by hand. In other words, hook 220 may not move from its position or the protrusions and recesses may not become disengaged because of forces imposed on the hook 220 during sudden forward or rearward movement of the seat 200 (or sudden acceleration or deceleration in the vehicle context). However, the force necessary to move the hook 220 or disengage the protrusions and recesses may not be so great as to require a tool to change positions.

Figure 6:
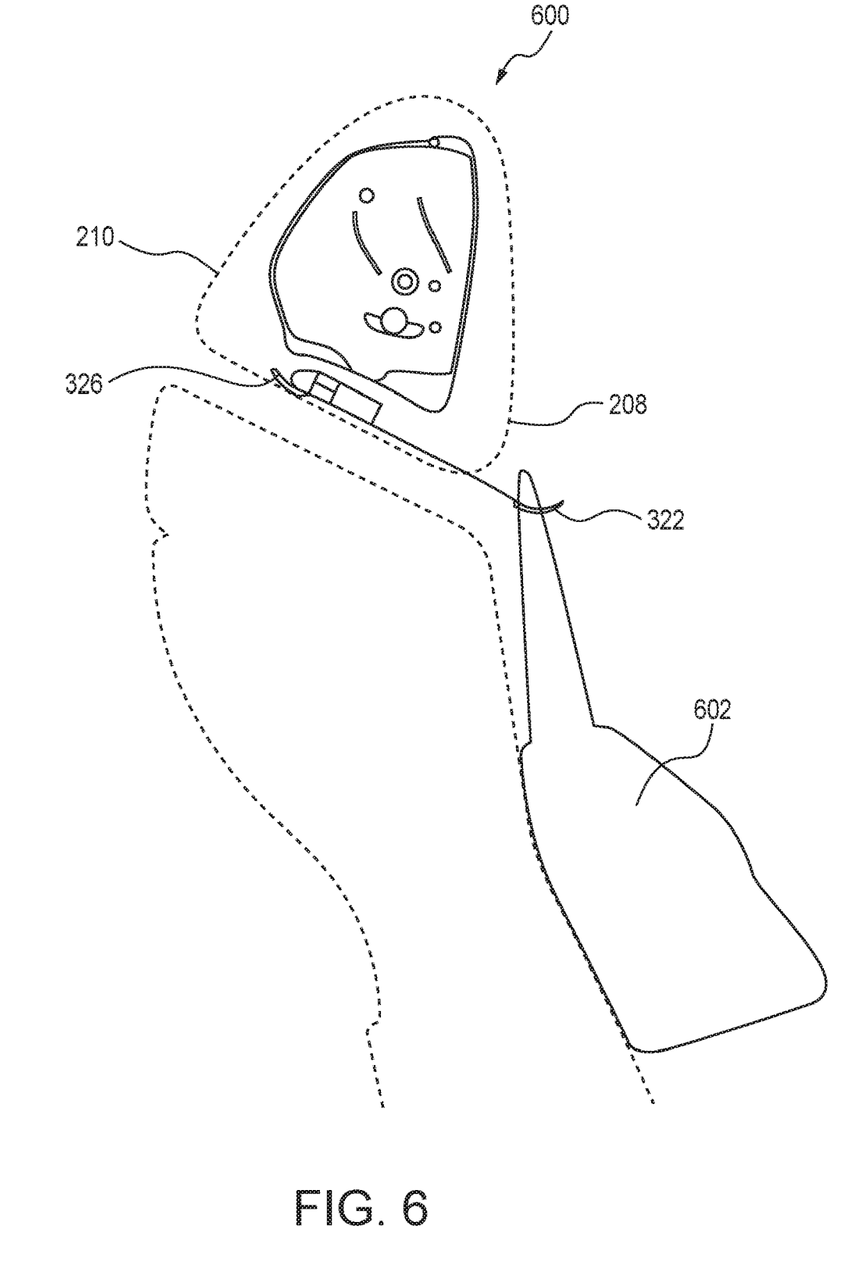
FIG. 6 is a cross sectional view of an exemplary embodiment of the headrest assembly shown in FIG. 2 with the hook in a forward position.

FIG. 6 is a cross sectional view of an exemplary embodiment of a headrest assembly 204 and hook 220 showing the hook 220 in a forward position 600. When in the forward position 600, the first hook external surface 322 and the second hook external surface 326 are offset from or forward of the first external surface 208 and second external surface 210, respectively. Referring back to FIG. 3 and FIG. 4 in relation to FIG. 6, when the hook 220 is in the forward position 600 one or more protrusions may be aligned with and be received by one or more recesses. In one exemplary embodiment, when in the forward position 600, the recess 334 in the groove 330 may receive the protrusion 420 of the tongue 416 and the recess 338 may receive the protrusion 418. In addition, the recess 346 in the groove 332 may receive the protrusion 426 of the tongue 422 and the recess 350 may receive the protrusion 424. While in the forward position 600, the hook 220 and hook portion 304 may be available to receive an item 602. As described above, the item 602 may be a bag, backpack, purse or similar container. Other items could also be positioned on the hook portion 304. While in the forward position 600, the hook 220 is stationary until a force is applied in the rearward direction to slide the protrusions from the recesses. As described above with regard to FIG. 5, the protrusions and recesses are sized and shaped in such a way to maintain the position of the hook 220 under normal conditions, while still allowing a user to change the position by hand.

Figure 7:
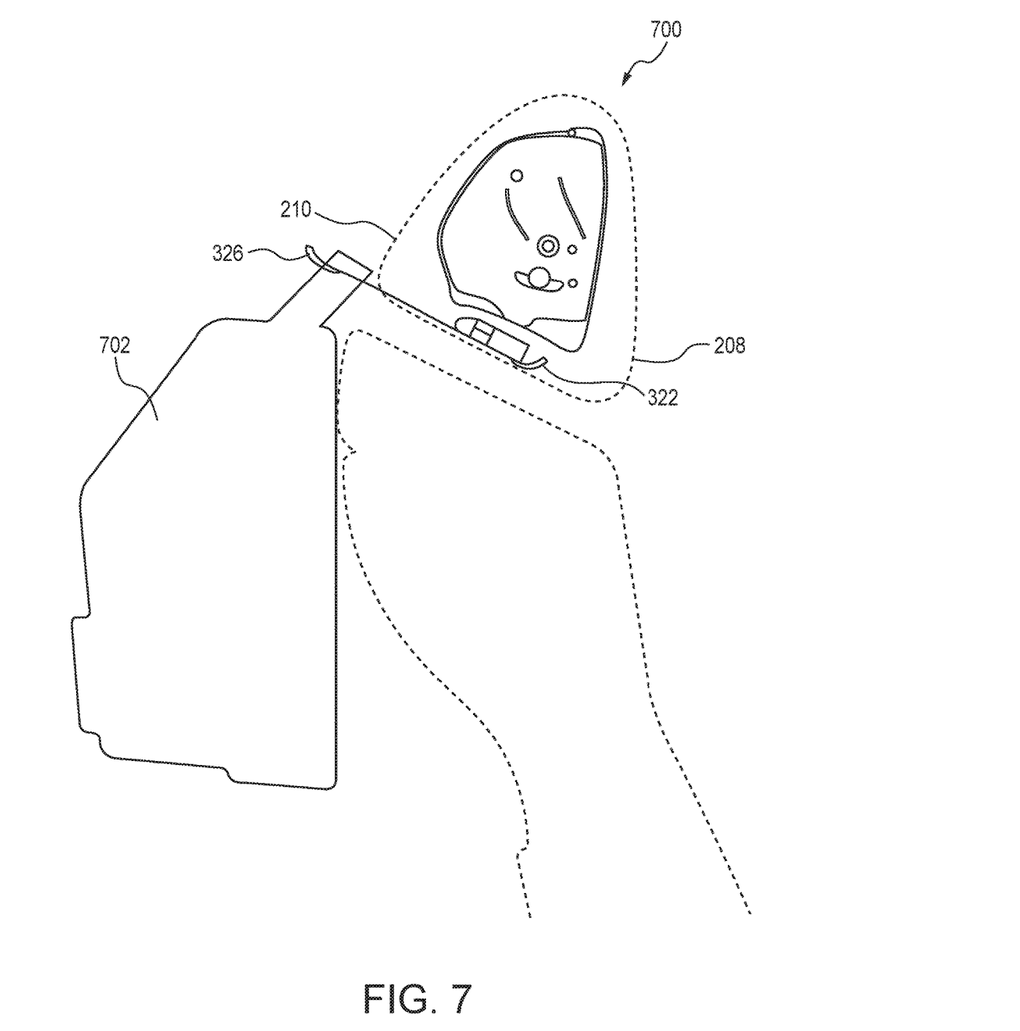
FIG. 7 is a cross sectional view of an exemplary embodiment of the headrest assembly shown in FIG. 2 with the hook in a rearward position.

FIG. 7 is a cross sectional view of an exemplary embodiment of a headrest assembly 204 and hook 220 showing the hook 220 in a rearward position 700. When in the rearward position 700, the first hook external surface 322 and the second hook external surface 326 are offset from or rearward of the first external surface 208 and second external surface 210, respectively. Referring back to FIG. 3 and FIG. 4 in relation to FIG. 7, when the hook 220 is in the rearward position 700 one or more protrusions may be aligned with and be received by one or more recesses. In one exemplary embodiment, when in the rearward position 700, the recess 340 in the groove 330 may receive the protrusion 420 of the tongue 416 and the recess 344 may receive the protrusion 418. In addition, the recess 352 in the groove 332 may receive the protrusion 426 of the tongue 422 and the recess 356 may receive the protrusion 424. While in the rearward position 700, the hook 220 and hook portion 304 may be available to receive an item 702. As described above, the item 702 may be a bag, backpack, purse or similar container. Other items could also be positioned on the hook portion 304. While in the rearward position 700, the hook 220 is stationary until a force is applied in the forward direction to slide the protrusions from the recesses. As described above with regard to FIG. 5, the protrusions and recesses are sized and shaped in such a way to maintain the position of the hook 220 under normal conditions, while still allowing a user to change the position by hand.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A headrest assembly, comprising:
    a headrest having a first external surface and a second external surface; and
    a hook slidingly engaged within the headrest, the hook having a first hook portion and a second hook portion;
    wherein when the hook is in a first position, the first hook portion is flush with the first external surface and the second hook portion is flush with the second external surface; and
    wherein when the hook is in a second position, the first hook portion is forward of the first external surface and the second hook portion is forward of the second external surface and when the hook is in a third position, the first hook portion is rearward of the first external surface and the second hook portion is rearward of the second external surface.

2. The headrest assembly of claim 1 wherein the hook includes a bottom surface that includes a plurality of lateral ridges.

3. The headrest assembly of claim 2 wherein the hook is made of a first material and the plurality of lateral ridges are made of a second material different from the first material.

4. The headrest assembly of claim 1 wherein the first hook portion includes a first hook external surface and the second hook portion include a second hook external surface; and
    wherein the first hook external surface and the second hook external surface are leather material.

5. The headrest assembly of claim 4 wherein the first external surface and the first hook external surface are both leather material.

6. The headrest assembly of claim 1 wherein the first external surface has a first contour and the first hook portion has a second contour that is the same as the first contour.

7. The headrest assembly of claim 6 wherein the second external surface has a third contour and the second hook portion has a fourth contour that is the same as the third contour.

8. The headrest assembly of claim 7 wherein the second contour and the fourth contour are different.

9. A headrest assembly, comprising:
    a headrest having a first external surface and a second external surface;
    a bracket attached to the headrest, the bracket having a channel; and
    a hook slidingly engaged within the channel, the hook having a first hook portion on a first end, a second hook portion on a second end, and a longitudinal portion disposed between the first hook portion and the second hook portion, the longitudinal portion having a flat top surface;
    wherein when the hook is in a first position, the first hook portion is forward of the first external surface and the second hook portion is forward of the second external surface; and
    wherein when the hook is in a second position, the first hook portion is rearward of the first external surface and the second hook portion is rearward of the second external surface.

10. The headrest assembly of claim 9 wherein when the hook is in a third position, the first hook portion is flush with the first external surface.

11. The headrest assembly of claim 10 wherein the channel includes a first protrusion and a second protrusion and the hook includes a first recess and a second recess.

12. The headrest assembly of claim 11 wherein the first protrusion is aligned with the first recess when the hook is in the first position and the second protrusion is aligned with the second recess when the hook is in the second position.

13. The headrest assembly of claim 12 wherein the first external surface has a first contour and the first hook portion has a second contour that is the same as the first contour.

14. The headrest assembly of claim 13 wherein the second external surface has a third contour and the second hook portion has a fourth contour that is the same as the third contour.

15. The headrest assembly of claim 14 wherein the second contour and fourth contour are different.

16. A headrest assembly comprising:
- a headrest having a first external surface and a second external surface;
- a bracket attached to the headrest, the bracket having a longitudinal length, the bracket further comprising:
- a channel disposed along the longitudinal length of the bracket, the channel having a first sidewall including a first tongue disposed longitudinally along the first sidewall, a second sidewall including a second tongue disposed longitudinally along the second sidewall and a top wall, wherein the first tongue includes a first protrusion and a second protrusion and the second tongue includes a third protrusion and a fourth protrusion; and
- a hook, comprising:
- a longitudinal portion comprising:
- a first end disposed toward the first external surface;
- a second end disposed toward the second external surface;
- a first side having disposed therein a first groove for receiving the first tongue in sliding engagement, wherein the first groove includes a first recess and a second recess;
- a second side having disposed therein a second groove for receiving the second tongue in sliding engagement, wherein the second groove includes a third recess and a fourth recess; and
- a bottom surface having a plurality of lateral ridges;
- a first hook portion disposed on the first end;
- a second hook portion disposed on the second end;
- wherein the hook is slidable between a first position, second position and third position;
- wherein when in the first position, the first protrusion is aligned with the first recess and the third protrusion is aligned with the third recess and the first hook portion extends forward of the first external surface; and
- wherein when in the second position, the second protrusion is aligned with the second recess and the fourth protrusion is aligned with the fourth recess and the second hook portion extends rearward of the second external surface.

17. The headrest assembly of claim 16 wherein when in the third position, the first hook portion is flush with the first external surface and the second hook portion is flush with the second external surface.

18. The headrest assembly of claim 17 wherein when in the third position, the first protrusion is aligned with a fifth recess within the first groove and the third protrusion is aligned with a sixth recess within the second groove.

19. The headrest assembly of claim 18 wherein the first hook portion has a first contour and the second hook portion has a second contour different than the first contour.

* * * * *